United States Patent [19]
Doerr

[11] 3,718,035
[45] Feb. 27, 1973

[54] SHELL CORE TESTING APPARATUS
[75] Inventor: Albert H. Doerr, Coldwater, Mich.
[73] Assignee: The Marmon Group, Inc.
[22] Filed: Oct. 16, 1970
[21] Appl. No.: 81,443

[52] U.S. Cl. ........................................ 73/95, 73/15.6
[51] Int. Cl. .................................................. G01n 3/08
[58] Field of Search ........................... 73/95, 98, 15.6

[56] References Cited

UNITED STATES PATENTS

| | | | |
|---|---|---|---|
| 3,057,182 | 10/1962 | Hackett | 73/95 X |
| 1,878,192 | 9/1932 | Scott | 73/98 |
| 404,200 | 5/1889 | Jump | 73/95 |
| 2,837,915 | 6/1958 | Brown et al. | 73/95 |
| 2,834,204 | 5/1958 | Braunlich | 73/95 |

FOREIGN PATENTS OR APPLICATIONS

| | | | |
|---|---|---|---|
| 1,470,470 | 2/1967 | France | 73/95 |
| 3,104 | 1870 | Great Britain | 73/98 |

*Primary Examiner*—Richard C. Queisser
*Assistant Examiner*—John P. Beauchamp
*Attorney*—Hofgren, Wegner, Allen, Stellman & McCord

[57] ABSTRACT

A testing apparatus for testing the tensile strength of a core formed of resin impregnated sand such as for use in a shell molding operation. The testing apparatus includes means for setting the resin impregnated sand to form a sample shell core and means for indicating the tensile strength of the set core. The indicating means includes a swingable element and means for progressively increasing torque to the swingable element to apply a progressively increasing tensile stress to the set core sample suitable to ultimately break the core sample. Scale means are associated with the indicating means for indicating the specific torque applied at the time of breakage of the sample.

13 Claims, 4 Drawing Figures

PATENTED FEB 27 1973 3,718,035

Inventor:-
Albert H. Doerr.
By Hofgren, Wegner, Allen,
Stellman & McCord Attys.

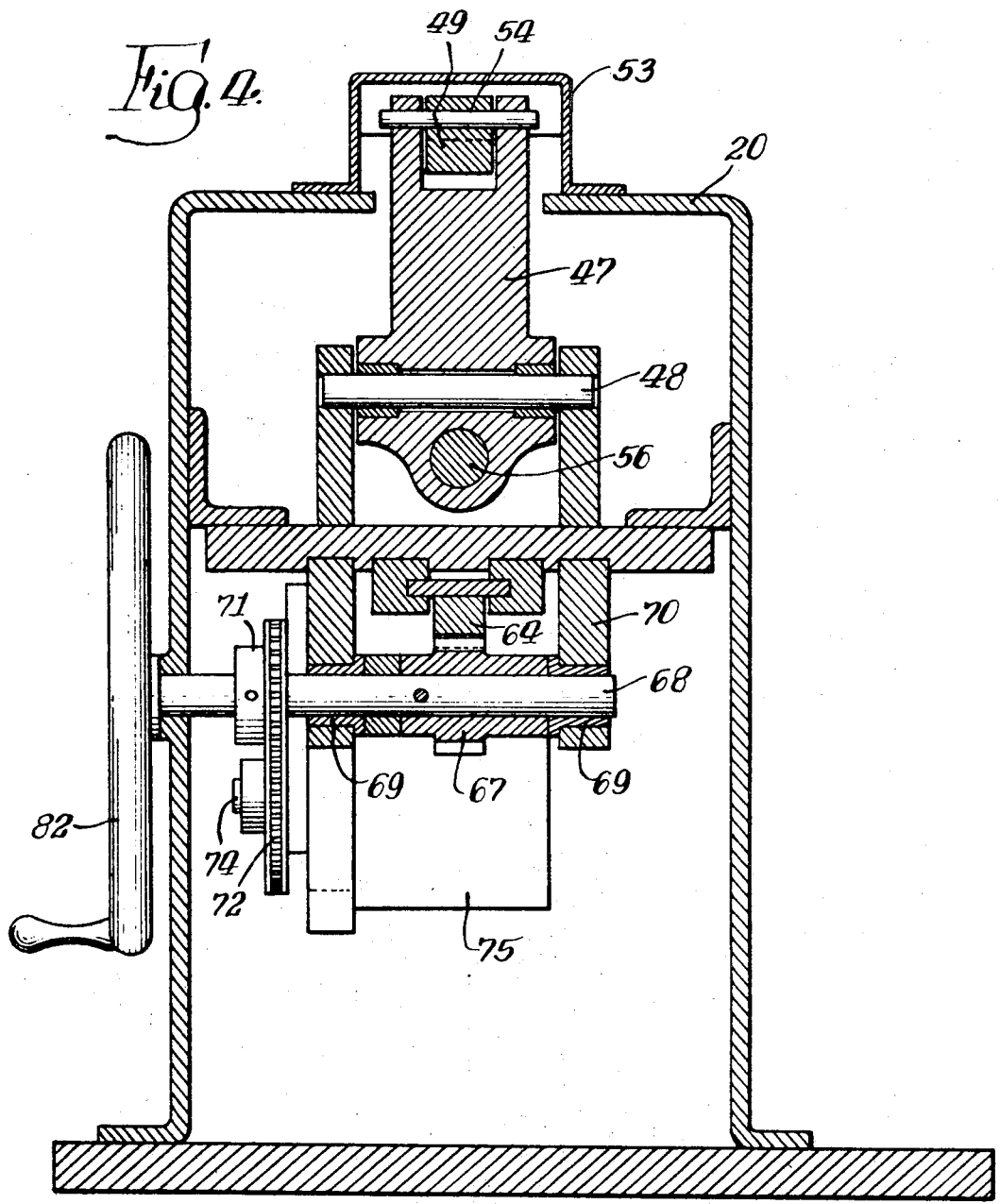

SHELL CORE TESTING APPARATUS

BACKGROUND OF THE INVENTION

1. Field of the Invention

This invention relates to testing apparatus and in particular to apparatus for testing the tensile strength of set molded sand bodies such as shell cores formed of resin impregnated sand.

2. Description of the Prior Art

The tensile strength of shell molding compositions has heretofore been determined by testing apparatuses which utilized relatively complicated and costly indicating mechanisms. Illustratively, the indicators have included drive screw assemblies driven by reversible electric motors. The drive screw is arranged to be slowly driven by the motor. The indicator associated therewith conventionally comprises a compressible spring which is compressed by the driving of the screw. Such spring biased indicators present the serious problem of biasing the indicator to the normal position. Such biasing means adversely affect the test structure and requires special limit means for controlling the action of the spring upon breakage of the sample.

SUMMARY OF THE INVENTION

The present invention comprehends an improved shell core testing apparatus having improved means for indicating the tensile strength of the set sand sample.

More specifically, the invention comprehends such a testing apparatus having means for setting a resin impregnated sand sample, means for holding one portion of the set sample, and means for indicating the amount of tensile force required to break the set sample to indicate the strength thereof comprising swingable means pivotally mounted for swinging about a pivot axis, means for connecting the swingable means to another portion of the set sample for urging the another portion away from the first portion thereof as a result of the swinging of the swingable means about the axis, means for applying an increasing torque to the swingable means to break the set sample, and means for indicating the torque applied to said swingable means by the torque applying means at the time the set sample breaks.

The means for applying the torque to the swingable means may comprise a weight movably positioned relative to the pivot axis of the swingable means to vary the moment arm of the weight and thereby vary the applied torque. The weight may be carried on a beam and roller means may be provided for permitting facilitated movement of the weight relative to the beam to effect the variation in the moment arm. The weight may be moved by suitable drive means and indicating means may be associated with the drive means for indicating the position of the weight upon breakage of the sample thereby correspondingly indicating the tensile force applied to the sample at the time of breakage. New and improved simple means are provided for calibrating the indicator and establishing a zero point for facilitated accurate testing of the sample.

The testing apparatus is simple and economical of construction while yet providing the desirable features discussed above.

BRIEF DESCRIPTION OF THE DRAWING

Other features and advantages of the invention will be apparent from the following description taken in connection with the accompanying drawing wherein:

FIG. 4 is a fragmentary enlarged vertical section taken substantially along the line 4—4 of FIG. 2.

DESCRIPTION OF THE PREFERRED EMBODIMENT

Figure 1:
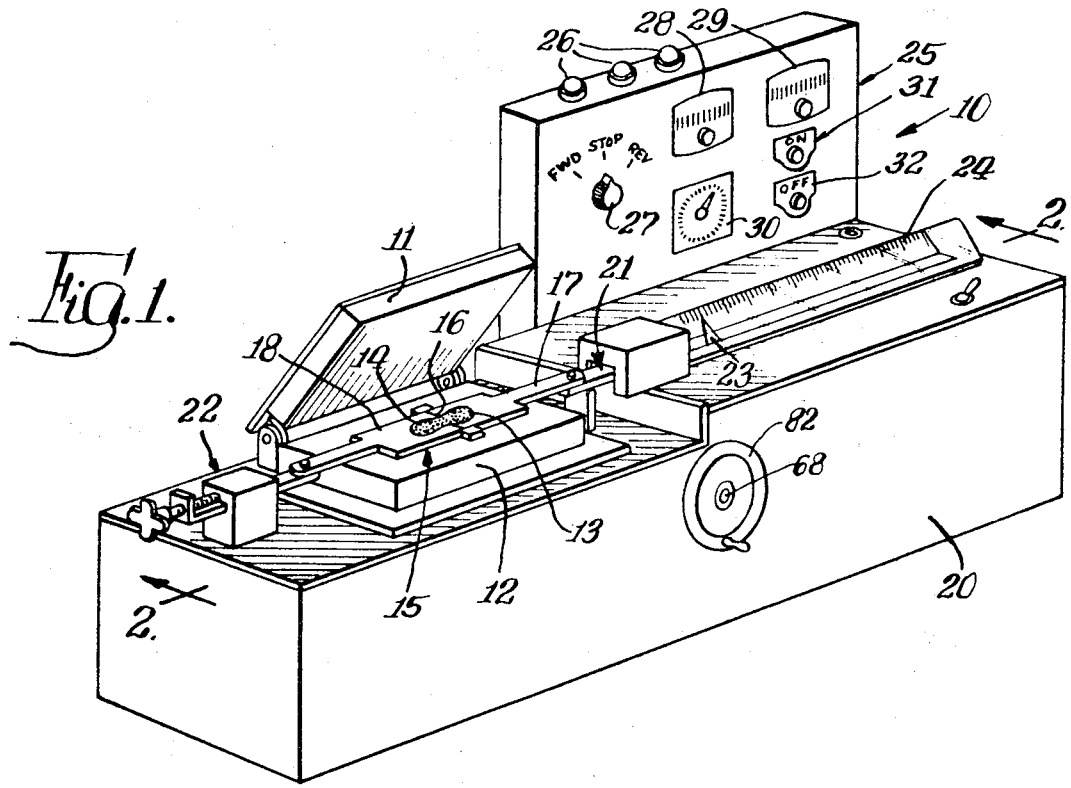
FIG. 1 is a perspective view of a shell core testing apparatus embodying the invention.
Figure 2:
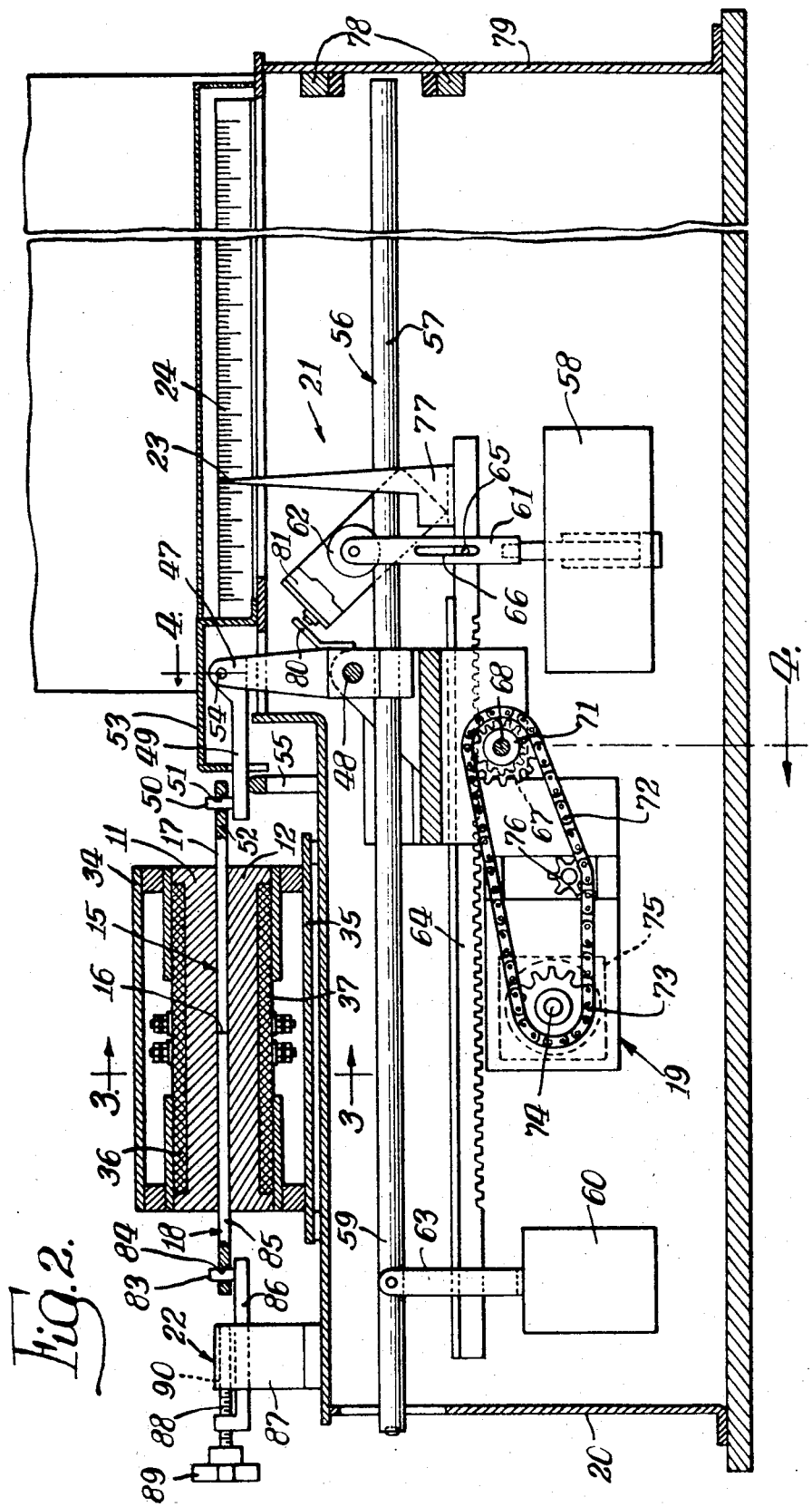
FIG. 2 is a fragmentary vertical section thereof taken substantially along line 2—2 of FIG. 1.

In the exemplary embodiment of the invention as shown in the drawing, a shell core testing apparatus generally designated 10 is shown to comprise an apparatus for determining the tensile strength of shell molding process material. Conventionally, such material is tested by forming a sample thereof wherein the resin impregnated sand is set by suitable application of heat. The resin normally comprises a phenolic thermosetting resin which is conventionally mixed in powdered form with the sand prior to the setting step. Herein, apparatus 10 includes a pair of hot plates 11 and 12 for applying suitable setting heat to resin impregnated sand material to be tested to form a set core sample 13 in the cavity 14 of a split mold generally designated 15. The mold cavity may have a conventional dumbbell shaped lateral cross-section, as best seen in FIG. 1, extending across the parting line 16 of the split mold. Thus, upon relative movement of the first mold part 17 away from the second mold part 18 subsequent to the setting operation, a tensile force is applied across the sample tending to break the sample apart in the narrow mid-portion thereof when the tensile limit thereof is reached. The force for separating the mold parts is developed by means of a motor drive generally designated 19 which may be mounted in a base cabinet 20 as seen in FIG. 2. The tensile force is delivered from drive 19 through an interconnecting indicator mechanism 21 connected to mold part 17. Mold part 18 is fixedly retained by an adjustable positioning mechanism generally designated 22. The tensile strength of the sample 13 is indicated by a suitable pointer 23 cooperating with a suitable scale 24 carried on the cabinet 20 as seen in FIG. 1. A control console generally designated 25 is provided at the rear of cabinet 20 for use in operating apparatus 10. The control may include suitable indicating lamps 26, a three-position motor control switch 27 for selectively effecting forward or reverse operation of motor drive 19, temperature controls 28 and 29 for showing the temperature of hot plates 11 and 12, a timer 30 for controlling the heating time, and an "On" pushbutton 31 and "Off" pushbutton 32 for controlling the overall operation of the apparatus. Control circuits for effecting such control of heating elements and motor drives are well known to those skilled in the art and require no further discussion herein, it being understood that any suitable control circuitry may be employed within the scope of the invention.

Figure 3:
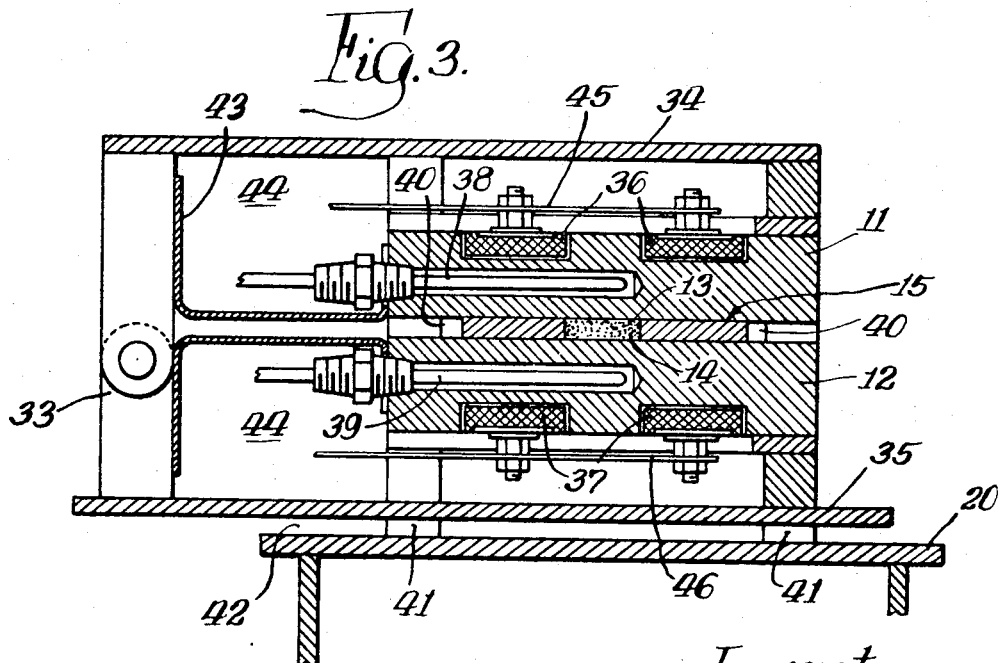
FIG. 3 is a fragmentary enlarged vertical section taken substantially along the line 3—3 of FIG. 2.

As best seen in FIG. 3, top hot plate 11 is hingedly associated with bottom hot plate 12 by means of a pair of upstanding hinges 33. Hot plate 11 is carried by a welded plate bracket 34 pivotally mounted on hinge 33 and hot plate 12 is fixedly carried on cabinet 20 by a welded plate bracket 35. Electrical heating elements 36 are mounted in plate 11 and heating elements 37 are mounted in plate 12. Thermostatic probe 38 is mounted in plate 11 and thermostatic probe 39 is mounted in plate 12 for accurately sensing the temperature of the sand sample 13 in cavity 14 of split mold 15. Suitable guides 40 are provided at opposite sides of the split mold for guiding the mold parts toward and from each other during the testing operation. Spacers 41 may be provided between the bottom plate bracket 35 and the top of cabinet 20 to provide an air gap 42 therebetween for limiting heat transfer from the hot plates downwardly to the cabinet. Suitable sheathing 43 may be provided for defining connection spaces 44. The probes 38 and 39 and electrical supply busses 45 and 46 for conducting current to the heating element 36 and 37 are brought to space 44.

Heating elements 36 and 37 may comprise conventional Chromalox strip heaters adapted to provide a temperature of approximately 400° to 500° Fahrenheit to the sand sample 13. Heating controls 28 and 29 may comprise conventional indicating type Chromalox MF2 controllers for setting and controlling the temperature of the hot plates individually. The heating of the sand sample 13 may be controlled by timer 30 for establishing a bake-out time illustratively of 1 to 3 minutes. Thus, to form the shell mold sample to be tested, the operator need merely operate switch 31 to provide electrical power to the apparatus. The desired temperature is preset in controls 28 and 29. After the mold reaches operating temperature, the resin impregnated sand is placed in cavity 14. Timer 30 is then set to the desired bake-out time. Upon completion of the bake-out period, motor 19 is operated by control 27 set to the "Forward" operating position. Mechanism 21 then functions to apply an increasing tensile force to the set mold sample until the sample breaks. The ultimate tensile strength is shown by the pointer 23 in conjunction with scale 24.

More specifically, mechanism 21 includes a swingable member herein comprising a lever 47 swingably carried on a fixed pivot 48. The upper end of the lever is provided with a connecting link 49 having at its distal end an upright pin 50 received in an opening 51 in an extension 52 of mold part 17 projecting outwardly from the hot plates 11 and 12 as best seen in FIG. 2. A cover 53 may be provided overlying the lever 47 and link 49. Link 49 may be connected to lever 47 by a suitable pivot 54 and may slidingly rest on an upstanding support 55 carried on cabinet 20 outwardly of cover 53.

Beam 56, herein a cylindrical rod, is fixedly secured to lever 47 and includes a first portion 57 extending to the right in FIG. 2 carrying a first weight 58, and a second portion 59 extending to the left carrying a second weight 60. Weight 58 is supported from a connector 61 by a roller 62 rolling on beam portion 57. Weight 60 comprises a counterbalancing weight hung from beam portion 59 by a suitable connector 63. The downward force of weight 58 acting on beam portion 57 through roller 62 at a distance from the vertical line of the axis of pivot 48 provides a torque variably greater than the counterbalancing torque of weight 60 to urge the lever 47 in a clockwise direction as seen in FIG. 2 and thereby apply a tensile force to the mold portion 17. The amount of torque so applied is varied by varying the position of roller 62 on beam portion 57 to vary the moment arm of the force application of weight 58.

Adjustable positioning of weight 58 on beam portion 57 is effected herein by motor drive 19 which longitudinally moves a rack 64 connected to weight connector 61 by a suitable pin 65 received in a vertically elongated slot 66 of the connector. Rack 64, as best seen in FIG. 4, is driven from a pinion 67 carried on a stub shaft 68 journalled in suitable bearings 69 in a carrier 70. Shaft 68 is driven by a suitable sprocket 71 which is driven by a chain 72 from a driver sprocket 73 carried on the shaft 74 of the drive motor 75. An idler sprocket 76 may be provided for maintaining the desired tautness in chain 72.

Indicator pointer 23 includes a base portion 77 secured to one end of rack 60 for movement directly therewith to thereby indicate accurately the longitudinal positioning of weight 58 relative to beam portion 57. Swinging movement of beam 56 about the axis of pivot 48 is limited by a pair of bumpers 78 carried on one end wall 79 of cabinet 20. Downward movement of beam portion 57 as upon breaking of the set sample in mold cavity 14 causes a clockwise swinging of lever 47 to move an actuator 80 carried thereby against a control switch 81 to terminate operation of drive motor 75 substantially instantaneously upon breakage of the test sample. Thus, the position of weight 58 at the instant of tensile breaking of the sample is indicated by the position of indicator 23 relative to scale 24 upon the stopping of the drive motor 75.

A suitable handwheel 82 may be provided on shaft 58 to permit manual operation of the tester when desired.

Mold part 18 is connected to positioning mechanism 22 by an anchor pin 83 received in an opening 84 in an extension 85 of the mold part extending outwardly from the hot plates to the left as seen in FIG. 2. Pin 83 is carried on a slide bar 86 adjustably mounted on a carrier 87 mounted on cabinet 20. Adjustment of the slide bar 86 may be effected by a suitable adjusting screw 88 operated by a knob 89 to rotate the screw in a threaded bore 90 of carrier 87.

Openings 51 and 84 preferably have a width greater than the diameter of the pins 50 and 83 received therein to provide limited free movement of the pins in the openings to the left and to the right as seen in FIG. 2. Illustratively, a clearance of approximately one thirty-second inch may be provided relative to each pin. Such clearance permits facilitated backloading of the mold by moving the weight 58 slightly rearwardly, or to the left, as seen in FIG. 2, of the starting position. This urges pin 50 to the left and correspondingly urges split mold 15 to the left so that mold part 18 is urged leftwardly against the fixed pin 83. Thus, the mold parts are forcibly urged together at the parting line 16 to provide the desired backloaded condition. When the weight 58 is returned to the "start" position, the split mold is moved as a unit with the set sample to urge the mold portion 18 to the right, as seen in FIG. 2, until the clearance is taken up and pin 83 limits further righthand movement of mold portion 18. Thus, with the illustrative one thirty-second inch clearance, a one-sixteenth inch lost motion connection is provided by the pins 50 and 83.

As indicated briefly above, tensile testing of the sample 13 is effected by initiating operation of motor 75 in a forward direction to apply progressively greater tensile force to the mold by drawing mold portion 17 to the right, as seen in FIG. 2, until the tensile limit is reached. The breaking of the sample permits lever 47 to pivot under the urging force of weight 58 in a clockwise direction to cause actuator 80 to operate switch 81 and discontinue operation of motor 75. The operator may now read the breaking tensile force directly from scale 24 as indicated by the setting of pointer 23. Scale 24 may be suitably calibrated to provide a direct reading in pounds per square inch for facilitated determination of the sample test tensile strength.

The limited movement provided by the elongated openings 51 and 84 further provides improved accuracy in the testing of the sample by permitting movement of the test sample with the mold portions relative to the hot plates thereby to overcome any frictional sticking of the test sample to the hot plates. The operation of the drive motor may be automatically controlled by the timer 30 if desired so that upon completion of the resin setting step, the energization of motor 75 may be automatically initiated. Switch 81 automatically terminates operation of the motor so that the entire test procedure may be automatically effected. The setting of pointer 23 is maintained upon the breakage of the test sample so that the user may make the observation of the pointer indication at any time subsequent to the sample breakage.

Upon completion of the test, the user may reverse the motor 75 to restore the mold to the original position permitting the mold to be cleaned out and made ready immediately for a new test as desired. In the illustrated embodiment, weight 58 may have a weight of 50 pounds, weight 60 may have a weight of 10 pounds, and a ratio of 10 to 1 may be provided in the mechanism 21 so that a tensile force of from zero to 200 pounds may be read on scale 24. Motor 75 illustratively may comprise a synchronous motor having a normal operating speed of approximately 3,600 rpm.

Thus, shell core testing apparatus 10 provides an improved controlled function of a shell molding sand core sample, or specimen, having automatic temperature and time control. The tensile strength of the set sample is read directly from the scale by an accurately positioned pointer which is positioned by means of a change in torque application to the means for applying tensile stress to the sample. The force transmitting and indicating structure of the invention is extremely simple and economical of construction while yet providing the improved functioning discussed above.

The foregoing disclosure of specific embodiments is illustrative of the broad inventive concepts comprehended by the invention.

I claim:

1. In a shell core testing apparatus having means for setting a resin impregnated sand sample, and means for holding one portion of the set sample, means for indicating the amount of tensile force required to break said set sample to indicate the strength thereof, comprising: swingable means pivotally mounted for swinging about a pivot axis; means for connecting said swingable means to another portion of the set sample for urging said another portion away from said first portion thereof as a result of the swinging of said swingable means about said axis; means for applying an increasing torque to said swingable means to effect a swinging of said swingable means sufficient to break said set sample, said torque applying means including a beam extending substantially horizontally and fixedly connected to said swingable means, a weight, and means for carrying said weight movably on said beam to be disposed selectively at different positions longitudinally of the beam to vary the spacing of the weight from said pivot axis and resultingly the torque applied thereby to said swingable means; and means for indicating the torque applied to said swingable means by said torque applying means at the time the set sample breaks.

2. The shell core testing apparatus of claim 1 wherein said carrying means comprises a roller movable along said beam.

3. The shell core testing apparatus of claim 1 wherein means are provided for adjustably counterbalancing said weight to adjust the torque applied to said swingable means by said weight.

4. The shell core testing apparatus of claim 1 wherein rack and pinion means are provided for changing the position of said weight longitudinally of said beam.

5. The shell core testing apparatus of claim 1 wherein rack and pinion means are provided for changing the position of said weight longitudinally of said beam, and said means for indicating the torque applied to said swingable means comprises an indicator carried by said rack and scale means fixedly positioned adjacent said indicator.

6. The shell core testing apparatus of claim 1 wherein means are provided for accurately indicating a preselected balanced position of said beam.

7. The shell core testing apparatus of claim 1 wherein said weight carrying means includes electric motor drive means and means for substantially instantaneously stopping said motor upon breaking of said set sample.

8. The shell core testing apparatus of claim 1 wherein said setting means comprises a first heating element juxtaposed to one face of said sand sample, a first thermostatic control for controlling the heating of said sample by said first heating element, a second heating element juxtaposed to another face of said sand sample opposite to said one face, and a second thermostatic control for controlling the heating of said sample by said second heating element independently of the control of said first heating element by said first control.

9. The shell core testing apparatus of claim 1 wherein said means for holding said one position of the set sample and said means for connecting said swingable means to said another portion of the set sample are spaced apart during the setting of said sample and include lost motion means for causing the same to be moved a preselected amount together to free the set sample from adhesion thereto prior to said urging of said another portion away from said one portion to break said set sample.

10. The shell core testing apparatus of claim 1 wherein said setting means includes a heating plate, and said means for holding and said means for connecting comprise a pair of mold portions defining with the heating plate a preselected mold cavity in which said resin impregnated sand sample is set, said swingable means defining means for moving the mold portions, together with the set sample, a preselected distance relative to said heating plate to a start position subsequent to a setting of the sample in said cavity to free the set sample from adhesion to said heating plate.

11. The shell core testing apparatus of claim 10 wherein said means for urging the mold portions toward each other and said means for moving the mold portions apart comprises holes in said mold portions and pin means having movable fit in said holes permitting limited movement of said pin means in said holes in the direction of urging together and moving apart of said mold portions.

12. The shell core testing apparatus of claim 11 wherein one of said pins is fixed and the other of said pins is movable.

13. The shell core testing apparatus of claim 11 wherein one of said pins is adjustably fixed to accurately position one of said mold portions in a test-start position.

* * * * *